United States Patent [19]
Herbert

[11] 4,386,964

[45] Jun. 7, 1983

[54] MODELLING COMPOUNDS

[75] Inventor: Virginia Herbert, Dural, Australia

[73] Assignee: Verve Enterprises Pty. Limited, Brighton, Australia

[21] Appl. No.: 320,501

[22] Filed: Nov. 12, 1981

Related U.S. Application Data

[63] Continuation-in-part of Ser. No. 130,128, Mar. 13, 1980, abandoned.

[30] Foreign Application Priority Data

Mar. 13, 1979 [AU] Australia .............................. PD7990

[51] Int. Cl.[3] .......................... C08L 89/00; C08H 1/00

[52] U.S. Cl. ...................................... 106/150; 106/157

[58] Field of Search ................ 106/150, 214, 209, 157

[56] References Cited

U.S. PATENT DOCUMENTS

| | | | |
|---|---|---|---|
| 2,127,298 | 8/1938 | Isaacs | 106/211 |
| 2,482,986 | 9/1949 | McClatchey et al. | 106/214 |
| 3,167,440 | 1/1965 | McVicker et al. | 106/150 |
| 3,804,654 | 4/1974 | Liu | 106/209 |
| 3,873,485 | 3/1975 | Fichera | 106/272 |

OTHER PUBLICATIONS

Stattler, H. R., *Recipes for Art and Craft Materials,* Lothrop, Lee and Shepard, New York, 1973, p. 36.

Wronsky, M. and Price, L., *Concoctions,* E. P. Dutton, N.Y. 1976, p. 54.

*Feed Me! I'm Yours,* Meadowbrook Press Minn. 1976, p. 94.

*Primary Examiner*—Theodore Morris

*Attorney, Agent, or Firm*—Shlesinger, Arkwright, Garvey & Dinsmore

[57] ABSTRACT

The present invention relates to a modelling powder and its method of manufacture and also to modelling compounds made from the modelling powder. The modelling compounds are of a soft pliable consistency such that they can be modelled into any desired shape or form. The modelling powder has long shelf life and is a dry-mix product for producing clean, non-sticky, non-staining, non-toxic and slow-drying modelling compound.

22 Claims, No Drawings

MODELLING COMPOUNDS

CROSS-REFERENCE TO RELATED APPLICATION

This application is a continuation-in-part of Application Ser. No. 130,128 filed Mar. 13, 1980 now abandoned.

BACKGROUND OF THE INVENTION (1) Field of the Invention

The invention relates to improvements in modelling compounds, and more particularly to modelling compounds for use by children and which include the ingredients of flour, salt, oil and water.

(2) Description of the Prior Art

U.S. Pat. No. 3,167,440 to McVicker et al. relates to modelling compounds based on grain flour. The essential ingredients are flour, water kerosene and a non-toxic chloride salt. Such modelling compounds are somewhat toxic because of the presence of kerosene. The preferred compounds in U.S. Pat. No. 3,167,440 also include alums as astringents. The use of alum is not recommended in Martindale, The Extra Pharmacopoeia, 27th Edition at page 215. Modelling compounds produced in accordance with U.S. Pat. No. 3,167,440 have been found to be inconsistent in stickyness and plasticity and a uniform product is not able to be produced.

Sattler, in "Recipies for Art and Craft Materials", Lothorp, Lee & Shepard Company/New York, at page 36 describes the following modelling compound formulation:

¾ cup salt=192 g=61.34% dry ingredients+oil
½ cup flour=72 g=23.00% dry ingredients+oil
2 teaspoons alum 10 g=3.19% dry ingredients+oil
¾ cup water=155 g or 150 ml
2 tablespoons vegetable oil=14 g or 17 ml=4.47% dry ingredients+oil
¼ cup flour=25 g=7.99% dry ingredients+oil
Total flour=69.33%.

On following directions, after the addition of the oil it was found necessary to add the extra ¼ cup of flour as the dough was very greasy. After 3 to 4 monutes of kneading the result was a malleable dough.

This formulation has the following disadvantages. Alum is not considered fit for human consumption (it is also regarded as damaging to the teeth) and for this reason as this formulation contains 10 g (3.19% of dry ingredients) of alum it would not be safe for small children as they are inclined to eat modelling compounds. The method of making this formulation does not lend itself to a dry mix formula as there is an excessive amount of oil and it is also necessary to add flour by kneading after the cooking process. This also means that the flour added after cooking has not gelatinised and therefore it would tend to become sticky later and reduce the life of the modelling compound.

Lansky, in "Feed me I'm Yours", Meadowbrook Press/Minn., at page 94 describes two modelling compound formulations. The first is an uncooked formulation, numbered 1, as follows:

1 cup flour=146 g=47.71%
½ cup salt=140 g=45.75%
1 teaspoon alum=2 g=0.65%
2 tablespoons oil=18 g=5.88%.

This formulation was made up as a dry mix by combining all ingredients in a blending machine. The end result was far too crumbly and oily for manufacturing, it would definitely stick in and clog up a ribbon mixer and would be impossible to pack or store in this form.

Just under ½ cup water was then added which resulted in a soft malleable dough. However, when kneaded with the hands it left a heavy residue of oil.

The second formulation, numbered 3, is as follows:

1 cup flour=146 g=47.71% dry ingredients
½ cup salt=140 g=45.75% dry ingredients
2 tablespoons cream of tartar=20 g=6.54% dry ingredients
1 cup water.

By following the instructions, a tacky, but quite pliable modelling compound resulted, However, cream of tartar is very expensive and at times hard to get and therefore not a manufacturing proposition. This would be manufacturable and it is safe for children but the quality of dough is poor by comparison with that made from the instant modelling powder.

Price and Wronsky, in "Concoctions", E. P. Dutton % Co., Inc./New York at page 54 describes the following modelling compound formulation:

½ cup flour=72 g=56.69% dry ingredients+oil
2 tablespoons salt=46 g=36.22% dry ingredients+oil
1 teaspoon cream of tartar=5 g=3.94% dry ingredients+oil
1 teaspoon cooking oil=4 g=3.15% dry ingredients+oil
⅓ cup water=85 g.

The method described does not lend itself to making a dry mix and is time consuming by comparison with that of the present invention.

BRIEF SUMMARY OF THE INVENTION

By "modelling compounds", this description and claims refers to a composition which is of a soft pliable consistency such that it can be modelled into any desired shape or form.

A modelling compound of this type should include the characteristics that it is clean, non-sticky, non-staining, non-toxic and slow-drying. It is also desirable that it has preservative properties.

It is an object of the invention to provide a modelling compound having the abovementioned characteristics in which the ingredients and the proportions thereof are such that the process of production of the modelling compound includes an intermediate stage at which the then mixture is in a dry powdery form (hereinafter called "the modelling powder"). The modelling powder having the characteristics that it will keep for a long period without deterioration and is also non-toxic.

The advantages of such an intermediate stage in the production of such modelling compounds is first, that the modelling powder can be readily stored for long periods without deterioration until it is required to be converted into modelling compound. By comparison, modelling compounds of the prior art tends to deteriorate and to dry out unless special precautions are taken.

Secondly, the modelling powder of the present invention is more conveniently packaged than is the modelling compound itself.

Thirdly, the quantity of modelling compound produced from the modelling powder can be readily adjusted to immediate requirements of the user.

Fourthly, as the quantity of modelling compound which is likely to be required at any one time is much less than the quantity of modelling compound that would be involved on a production line, the final step in the production of the modelling compound can be carried out more efficiently from the intermediate stage of the modelling powder, both as to the time taken and in the quality of the modelling compound produced by the end-user.

It is another object of the invention to provide a modelling powder which can be readily converted into a modelling compound.

It is a further object of the invention to provide a modelling powder as an intermediate step in the production of a modelling compound such that first, it is of a dry powdery nature. Secondly, it will keep for long periods without deterioration. Thirdly, it is non-toxic. Fourthly, it can be converted into a modelling compound by the addition of a predetermined quantity of water and the application of predetermined heat. Fifthly, the modelling compound so produced is easily handled, being clean, non-sticky and non-staining and is entirely non-toxic.

In order to achieve the abovementioned advantages and to provide an intermediate step in the production of a modelling compound, it is necessary to select the ingredients and the proportions thereof such that when mixed at the intermediate step it is in a dry powdery form having the aforementioned characteristics and also such that when it is converted into modelling compound by the addition of water and heat, the modelling compound produced has the characteristics mentioned above, viz: that it is clean, non-sticky, non-staining, non-toxic and slow drying.

DETAILED DESCRIPTION OF THE INVENTION

The present invention is based on the discovery that a satisfactory dry mix for making a modelling compound results if the amount of acid in the modelling powder is controlled such that the pH-value in the resulting modelling compound is between about 2.6 and about 3.5, preferably between 2.8 and 3.3.

The essential ingredients in the modelling powder of the present invention are grain flour, a food grade oil, a food grade pH adjusting agent and common salt, or a salt equivalent thereto, such as potassium chloride. As small children are likely to eat modelling compounds and as excessive amounts of potassium are known to upset the body's electrolyte balance, common salt (sodium chloride) is preferred.

In order to produce a satisfactory dry modelling powder, the amount of food grade oil to other dry ingredients must be such as to produce a dry powdery mixture.

The present invention therefore provides an improved modelling powder suitable for producing a modelling compound which modelling powder comprises a mixture of grain flour and sodium chloride or a salt equivalent thereto, together with an amount of food grade oil such that the resulting mixture has a dry, powdery consistency in which the improvement comprises the inclusion in the mixture of an amount of a food grade pH adjusting agent such that when the flour is gelatinised by the addition of water and heat, the resulting modelling compound has a pH-value between about 2.6 and about 3.5.

In another aspect, the invention provides a process for manufacturing an improved modelling powder, which process comprises admixing grain flour and sodium chloride or a salt equivalent thereo, together with sufficient of a food grade pH adjusting agent such that when the flour is gelantinised by the addition of water and heat, the resulting modelling compound has a pH-value between about 2.6 and about 3.5 and thereafter adding whilst mixing continues an amount of food grade oil such that the resulting mixture has a dry, powdery consistency.

The invention also provides a process for manufacturing a modelling compound which process comprises adding water and heat to a modelling powder which comprises a mixture of grain flour and sodium chloride or a salt equivalent thereto, together with an amount of food grade oil such that the resulting mixture has a dry, powdery consistency in which the improvement comprises of the inclusion in the mixture of an amount of a food grade pH adjusting agent such that, when the flour is gelatinised by the addition of water and heat, the resulting modelling compound has a pH-value between about 2.6 and about 3.5, to gelatinise the grain flour particles therein.

It is preferred that about 2 parts by weight water is added to about 3 parts by weight modelling powder. It is also preferred that the water and modelling powder are heated to a temperature of at least about 40° C. and more preferably to about 60° C.

If a predetermined quality of water is added to the modelling powder and also heat, at a temperature of approximately 40° C. gelatinisation of the grain flour is caused. This is a swelling of starch granules which are softened by the absorption of water. However, the presence of the food grade pH adjusting agent restricts the swelling and results in a toughening of the starch particles. This causes the water to be squeezed out in an astringent action. The excess water is then absorbed by the salt. The whole mixture would then comprise the modelling compound.

Inherent in the production of a satisfactory modelling compound by using the process of gelatinisation is the requirement that the added water and heat are substantially evenly distributed during the process. In the case of the invention the provision of the intermediate step in the form of a modelling powder enables the production to be completed in small quantities such that the desired distribution of water and heat is achieved.

The inclusion of oil in the ingredient is for a threefold purpose. First, the presence of the oil as a coating on the flour particles during the gelatinisation process helps to form the mixture into a homogeneous mass and bind the particles together. Secondly, the presence of the oil reduces stickiness in the modelling compound. Thirdly, the oil provides a coating to the particles in the modelling compound which helps them retain their moisture content. This action slows the drying of the modelling compound.

pH control allows less oil to be used in the modelling compound produced according to the invention. If the pH is too high, a sticky product will result. This stickyness has been avoided in prior art modelling compounds by increasing the proportion of oil. If the proportion of oil is increased in the modelling powder of the present invention, a dry, powdery consistency is not able to be achieved, and hence pH control is essential in achieving a modelling powder containing oil which can be packed and marketed as a dry-mix and still be easily re-processed by the end-user into a soft, pliable, non-sticky modelling compound.

Other ingredients which may be added to the modelling powder are stabilised talc and food grade dyes or pigments, especially dry powder dyes.

The presence of talc in the modelling mixture has the effect that the modelling compound is given a silky texture which is inherent in this dry lubricating material. It also appears to have the effect of improving the binding process in the modelling compound. Referred amounts are 2 to 10% by weight.

It is important that sterilised talc be used in the modelling powder of the invention, as the resulting modelling compound is liable to be eaten by small children. Raw talc has been found to contain tetanus spores which can be killed by ethylene oxide or gamma ray sterilisation.

The dye, of course, provides the colouring of the modelling compound.

The invention will now be described by reference to the preferred embodiment.

In the preferred embodiments the following ingredients in the percentages of the total weight of the resulting modelling powder are mixed together:

| | % | | Range (Parts by Weight) |
|---|---|---|---|
| Grain flour | approx. | 42.67 | about 40–about 45 |
| Common salt | approx. | 48.27 | about 45–about 50 |
| Food grade oil | approx. | 2.57 | about 2–about 3 |
| Food grade pH adjusting agent | approx. | 0.27 | about 0.2–about 0.4 |
| Sterilised talc | approx. | 5.6 | about 2–about 10 |
| Dry powder dye | approx. | 0.52 | about 0.1–about 1 |

In the production of modelling powder with a total weight of 375 g, the respective weights of the ingredients would be:

| | |
|---|---|
| Grain flour | 160 g |
| Common salt | 181 g |
| Vegetable oil | 10 g |
| Tartaric acid | 1 g |
| Sterilised talc | 21 g |
| Dry powder dye - approx. | 2 g |

In the preferred embodiment the modelling powder is prepared by blending all the ingredients together. The only "non-dry" ingredient is the vegetable oil. However, the quantity of vegetable oil in comparison with the quantity of the other ingredients is such that when they are all blended the resulting mixture is of a dry, powdery consistency.

The grain flour is preferably treated to safeguard against weevils. The vegetable oil preferably contains anti-oxidants and other preservatives to prevent rancidity.

The dry powder dyes used in the preferred embodiment are coal tar dyes, and the basic colours of yellow, red, green and blue have been produced by using the following dyes:

| Colour | Dyes | Percentage of total weight |
|---|---|---|
| YELLOW | Tartrazine - Colour Index No. 19140 | 0.16% |
| | Sunset Yellow - Colour Index No. 15985 | 0.009% |
| RED | Ponceau 4R standard Colour Index No. 16255 Keith Harris - No. 363 | 0.1% |
| | Orange C105 (Keith Harris) Colour Index Nos. 15985, 14720, 19140 | 0.2% |
| GREEN | Lime Green C572 (Keith Harris) Colour Index Nos. 19140, 42090 | 0.13% |
| | Brilliant Blue C400 Colour Index No. 42090 | 0.005% |
| BLUE | Brilliant Blue C400 Colour Index No. 42090 | 0.06% |

These dyes provide very strong colours which are permanent and do not come off on the hands when the modelling compound is used.

In commercial manufacture of the modelling powder of the invention, approximately 600 kg batches are employed.

Typical batches are set out in Table I.

TABLE I

| Component | Batch 1 (Yellow) | Batch 2 (Green) | Batch 3 (Red) | Batch 4 (Blue) |
|---|---|---|---|---|
| Wheat flour | 250 kg | 250 kg | 250 kg | 250 kg |
| Sodium chloride | 300 kg | 300 kg | 300 kg | 300 kg |
| Vegetable oil | 15 kg | 15 kg | 15 kg | 15 kg |
| Tartaric acid | 1.62 kg | 1.62 kg | 1.62 kg | 1.62 kg |
| Sterilised talc | 35 kg | 35 kg | 35 kg | 35 kg |
| Tartrazine | 960 g | — | — | — |
| Sunset Yellow | 54 g | — | — | — |
| Ponceau 4R Standard | — | — | 600 g | — |
| Orange C105 | — | — | 1200 g | — |
| Lime Green C572 | — | 780 g | — | — |
| Brilliant Blue C400 | — | 30 g | — | 360 g |

The batches are mixed in a concical mixer with auger such as a NAUTA$^{R}$ mixer. Other dry powder mixers known in the food processing art are equally suitable.

30 kg sodium chloride, the tartaric acid and the dyes are first mixed to form a pre-mix which assists in dispersing the dyes. 270 kg of sodium chloride is placed in the mixer and the mixing action started. The pre-mix is then added slowly followed by the flour then the sterilised talc. Mixing is continued for about five minutes then the oil is poured in slowly as mixing continues. The batch is then mixed until the oil is evenly distributed. This usually takes about 5 minutes.

The batch is then moved to a conventional packing line and filled volumetrically with check weighing into plastic bags which are then placed in cartons.

pH of the modelling compound is checked by random sampling from the packing line. Typical results of sampling tests are set forth in Table II.

TABLE II

| Colour | Highest pH | Mean pH | Lowest pH |
|---|---|---|---|
| Yellow | 3.13 | 3.063 | 2.94 |
| Green | 3.03 | 2.949 | 2.80 |
| Red | 3.27 | 3.265 | 3.26 |
| Blue | 3.08 | 3.106 | 3.01 |

Modelling compound is produced by mixing a predetermined quantity of water with a predetermined quantity of modelling powder and applying heat to the mixture to make the grain flour particles gelatinise.

It is preferred that the ratio of modelling powder to water is about 3:about 2 by weight.

In the preferred embodiment of the invention the process of producing modelling compound consists of mixing 250 ml of hot or cold water with 375 g of the modelling mixture, raising its temperature to approximately 60° C. and continuing the mixing until the modelling compound is of the desired consistency. This is usually a period of 1 to 4 minutes.

When this final step in the production of the modelling compound only involves relatively small quantities, the water and heat can be readily evenly distributed for even gelatinisation and therefore for a better quality of modelling compound.

Although specific ingredients have been used in the preferred embodiment, other ingredients having similar properties can be substituted.

Thus suitable substitutes for sodium chloride are sodium hypochlorite, sodium chlorite, potassium chloride and the like.

Although tartaric acid is preferred (on a cost basis) as the food grade pH adjusting agent, any food grade pH adjusting agent which, on addition of the appropriate amount, will result in the production of a modelling compound of pH 2.6 to 3.5 is suitable. In order to optimise the dry mix, however, a solid food grade pH adjusting agent is preferred. Other examples are citric acid, sorbic acid and sodium or potassium bitartrate.

If desired flavouring agents or perfumes may also be added to the modelling powder of the invention.

What I claim is:

1. In a modelling powder suitable for producing a modelling compound, said modelling powder comprising a mixture of about 40 to about 45 parts by weight of grain flour and about 45 to about 50 parts by weight of sodium chloride, together with about the 2 to about 3 parts by weight of a food grade oil such that the resulting mixture has a dry, powdery consistency, the improvement comprising including in said mixture about 0.2 to about 0.4 parts by weight of tartaric acid or citric acid such that when said flour is gelatinized by the addition of heat and about 2 parts by weight of water to about 3 parts by weight of said modelling powder, the resulting modelling compound has a pH-value between about 2.6 and about 3.5.

2. The modelling powder as claimed in claim 1, further comprising about 2 to about 10 parts by weight of sterilised talc.

3. The modelling powder as claimed in claim 1, further comprising about 0.1 to about 1 part by weight of at least one food grade dye or pigment.

4. The modelling powder as claimed in claim 1, further comprising about 2 to about 10 parts by weight of sterilised talc and about 0.1 to about 1 part by weight of at least one food grade dye or pigment.

5. A process for manufacturing an improved modelling powder, which process comprises admixing about 40 to about 45 parts by weight of grain flour and about 45 to about 50 parts by weight of sodium chloride, together with about 0.2 to about 0.4 parts by weight of tartaric acid or of citric acid such that when said flour is gelatinized by the addition of heat and about 2 parts by weight of water to about 3 parts by weight of said modelling powder, the resulting modelling compound has a pH-alue between about 2.6 and about 3.5 and thereafter adding, whilst mixing continues, from about 2 to about 3 parts by weight of food grade oil such that the resulting mixture has a dry, powdery consistency.

6. The process as claimed in claim 5, wherein said pH-value is between about 2.8 and about 3.3.

7. The process as claimed in claim 5 or claim 6, wherein about 2 to about 10 parts by weight of sterilized talc is added to said admixture prior to the addition of said oil.

8. The process as claimed in claim 5 or claim 6 wherein about 0.1 to about 1 part by weight of at least one food grade dye or pigment is added to said admixture prior to the addition of said oil.

9. The process as claimed in claim 5 or claim 6, wherein about 2 to about 10 parts by weight of sterilized talc and about 0.1 to about 1 part by weight of at least one food grade dye or pigment is added to said admixture prior to the addition of said oil.

10. The modelling powder as defined in claim 1, wherein said pH value is between about 2.8 and about 3.3.

11. The modelling powder as defined in claim 10 further comprising about 2 to about 10 parts by weight of sterilized talc.

12. Modelling powder as defined in claim 10 further comprising about 0.1 to about 1 part by weight of at least one food grade dye or pigment.

13. The modelling powder as defined in claim 10 further comprising about 2 to about 10 parts by weight of sterilized talc and about 0.1 to about 1 part by weight of at least one food grade dye or pigment.

14. A process for manufacturing a modelling compound comprising adding heat and about 2 parts by weight of water to about 3 parts by weight of the modelling powder of claim 1 or claim 2 or claim 3 or claim 4 or claim 10 or claim 11 or claim 12 or claim 13 to gelatinize the flour therein.

15. The process as claimed in claim 14, wherein said water and said modelling powder are heated to a temperature of at least about 40° C.

16. The process as claimed in claim 15, wherein said temperature is about 60° C.

17. The process as defined in claim 14, wherein 250 milliliters of water is added to 375 grams of said modelling powder.

18. A modelling powder comprising 250 kg wheat flour, 300 kg sodium chloride, 15 kg vegetable oil, 1.62 kg tartaric acid and 35 kg sterilized talc.

19. A modelling compound produced by adding heat and about 2 parts by weight of water to about 3 parts by weight of the modeling powder defined in claim 1 or claim 2 or claim 3 or claim 4 or claim 10 or claim 11 or claim 12 or claim 13 or claim 18.

20. A dry mix modelling compound which results in a modelling compound with a pH of about 2.6 to about 3.5 after about 3 parts by weight of said dry mix are added to about 2 parts by weight of water and heated, said dry mix consisting essentially of;

a. about 40 to about 45 parts by weight of grain flour;
b. about 45 to about 50 parts by weight of sodium chloride;
c. about 2 to about 3 parts by weight of a food grade oil; and,
d. about 0.2 to about 0.4 parts by weight of a food grade pH adjusting agent drawn from the group of tartaric acid, citric acid, sorbic acid, or sodium bitartrate.

21. A dry mix modelling compound which results in a modelling compound with a pH of about 2.8 to about 3.3 after about 3 parts by weight of said dry mix are added to about 2 parts by weight of water and heated, said dry mix consisting essentially of:

a. about 40 to about 45 parts by weight of grain flour;
b. about 45 to about 50 parts by weight of sodium chloride;

c. about 2 to about 3 parts by weight of a food grade oil; and, d. about 0.2 to about 0.4 parts by weight of a food grade pH adjusting agent drawn from the group of tartaric acid, citric acid, sorbic acid, or sodium bitartrate.

22. A dry mix modelling powder which results in a modelling compound with a pH of about 2.6 to about 3.5 after about 3 parts by weight of said dry mix are added to about 2 parts by weight of water and heated, said dry mix consisting essentially of:

a. about 40 to about 45 parts by weight of grain flour;

b. about 40 to about 45 parts by weight of a member drawn from the group sodium hypochlorite, sodium chlorite, potassium chloride, or sodium chloride;

c. about 2 to about 3 parts by weight of a food grade oil; and, d. about 0.2 to about 0.4 parts by weight of a food grade pH adjusting agent drawn from the group of tartartic acid, citric acid, sorbic acid or sodium bitartrate.

* * * * *